(12) United States Patent
Kim et al.

(10) Patent No.: US 10,040,362 B2
(45) Date of Patent: Aug. 7, 2018

(54) SECONDARY CHARGING PAD ALIGNMENT METHOD, WIRELESS CHARGING CONTROL APPARATUS, AND METHOD OF OPERATING CHARGER

(71) Applicant: Hyundai Motor Company, Seoul (KR)

(72) Inventors: Do Hoon Kim, Seoul (KR); Jae Yong Seong, Gyeonggi-Do (KR); Zeung Il Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 14/835,299

(22) Filed: Aug. 25, 2015

(65) Prior Publication Data

US 2016/0059723 A1   Mar. 3, 2016

(30) Foreign Application Priority Data

Aug. 27, 2014 (KR) .................. 10-2014-0112135

(51) Int. Cl.
*H01M 10/44* (2006.01)
*H01M 10/46* (2006.01)
*B60L 11/18* (2006.01)

(52) U.S. Cl.
CPC ....... *B60L 11/1831* (2013.01); *B60L 11/1829* (2013.01); *B60L 11/1833* (2013.01); *B60L 11/1835* (2013.01); *B60L 2230/14* (2013.01); *B60L 2240/12* (2013.01); *B60L 2240/22* (2013.01); *B60L 2240/24* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/14* (2013.01)

(58) Field of Classification Search
CPC ............ H02J 5/005; H02J 7/025; H02J 7/355
USPC .................. 320/104, 108, 109; 307/104
See application file for complete search history.

(56) References Cited

U.S. PATENT DOCUMENTS

| | | | | |
|---|---|---|---|---|
| 5,669,470 A | * | 9/1997 | Ross ..................... | B60L 5/005 191/10 |
| 2005/0270021 A1 | * | 12/2005 | Roessler ............... | G01D 5/142 324/251 |
| 2012/0091959 A1 | * | 4/2012 | Martin ................. | B60L 11/1829 320/109 |
| 2013/0128638 A1 | * | 5/2013 | Irish .................... | H02M 1/4266 363/126 |
| 2014/0125140 A1 | * | 5/2014 | Widmer ............... | H02J 7/025 307/104 |
| 2016/0028265 A1 | * | 1/2016 | Bell ...................... | H02J 7/025 320/108 |

* cited by examiner

*Primary Examiner* — Edward Tso
(74) *Attorney, Agent, or Firm* — Mintz Levin Cohn Ferris Glovsky and Popeo, P.C.; Peter F. Corless

(57) ABSTRACT

Provided are a secondary charging pad alignment method, a wireless charging control apparatus, and a method of operating a charger. The secondary charging pad alignment method includes monitoring signals induced at a plurality of hall sensors arranged in a vehicle, estimating a position of a primary charging pad of a charger based on measured values of the plurality of hall sensors, and generating one of movement information for moving a secondary charging pad disposed in the vehicle to the estimated position of the primary charging pad and steering information of the vehicle corresponding to the movement information.

18 Claims, 11 Drawing Sheets

FIG. 2B
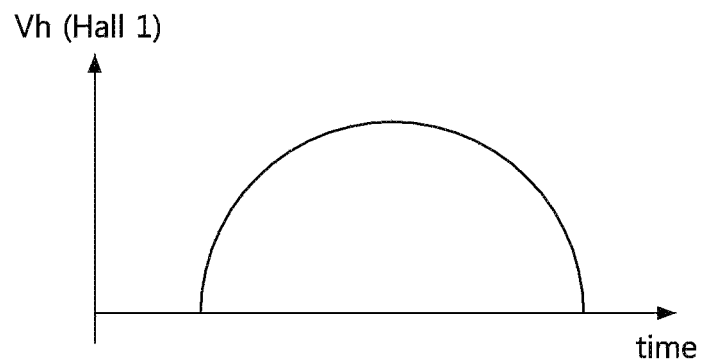
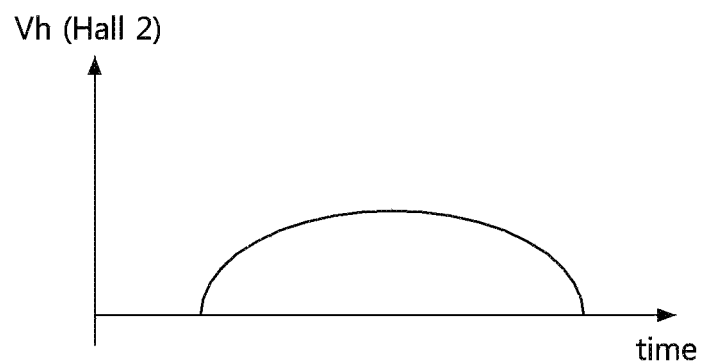
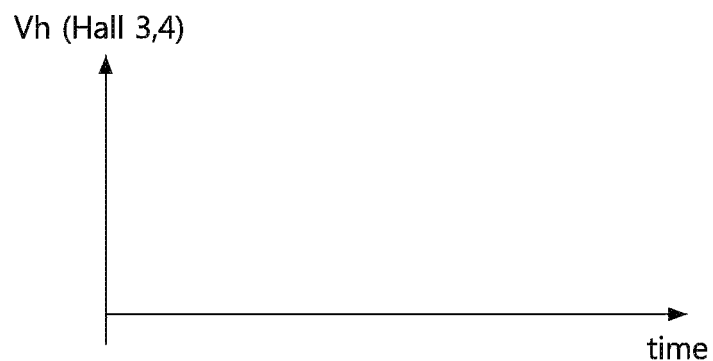

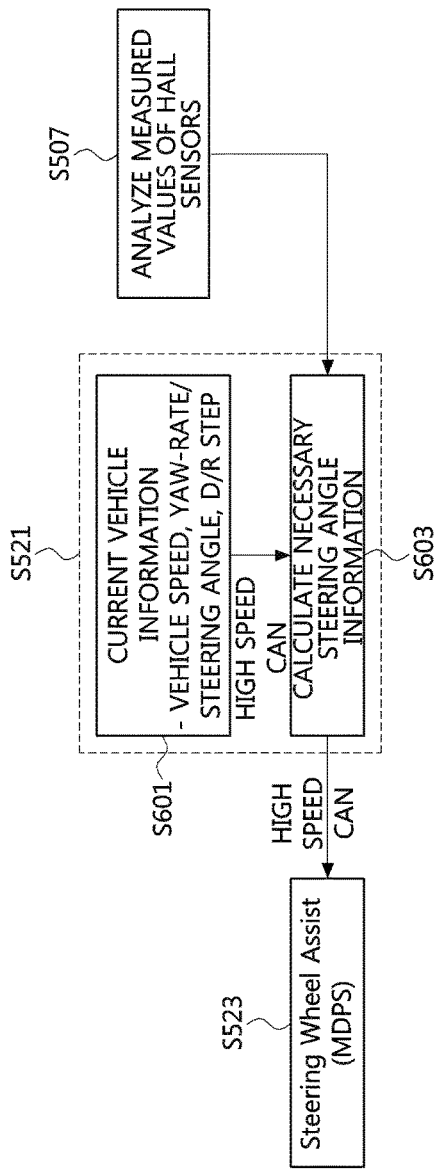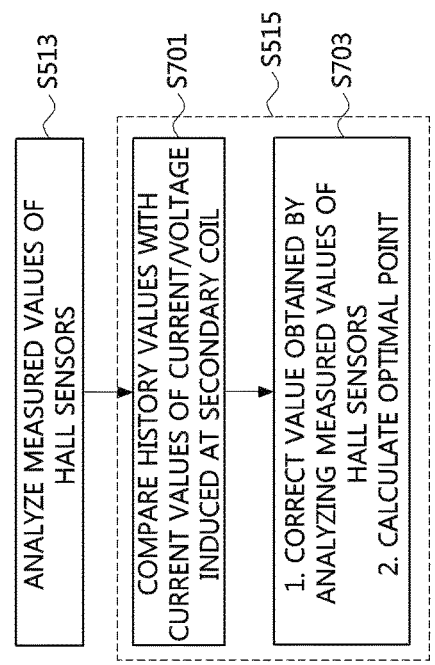

SECONDARY CHARGING PAD ALIGNMENT METHOD, WIRELESS CHARGING CONTROL APPARATUS, AND METHOD OF OPERATING CHARGER

CLAIM FOR PRIORITY

This application claims priority to Korean Patent Application No. 10-2014-0112135 filed on Aug. 27, 2014 in the Korean Intellectual Property Office (KIPO), the entire contents of which are hereby incorporated by reference.

BACKGROUND

1. Technical Field

Example embodiments of the present invention relate in general to a wireless charging apparatus for a vehicle, and more specifically, to a secondary charging pad alignment method, a wireless charging control apparatus, and a method of operating the charger capable of efficiently aligning a secondary charging pad of a vehicle with a primary charging pad of a charger.

2. Related Art

Recently, a technology which relates to plug-in hybrid vehicles and electric vehicles has been rapidly developed. A part or all of a driving force of such vehicles is supplied due to electric energy of a battery. As a method of charging the battery with electric energy, there are a plug type in which a charger is connected to the battery of the vehicle through wires and a wireless charging type which does not use a plug.

The wireless charging type includes a magnetic induction type and a magnetic resonance type. Among them, the magnetic induction type can wirelessly transmit power with relatively high efficiency within a short distance of about several centimeters. The magnetic resonance type has been studied and developed such that, for example, when a vehicle approaches a wireless charger, a wireless charging control apparatus of the vehicle recognizes the wireless charger and charges a battery through communication with the wireless charger.

Meanwhile, it is necessary for a secondary charging pad mounted on a vehicle and a primary charging pad connected to a charger to align positions of coils to increase wireless charging efficiency. For this, in the related art, an alignment method using an optical sensor and a vision sensor has been studied. However, in the case of the alignment method using existing sensors, most sensors are exposed to a strong electric field and magnetic field of a wireless power transmission atmosphere, thereby causing various instances of malfunction or poor operation.

SUMMARY

Accordingly, example embodiments of the present invention are provided to substantially obviate one or more problems due to limitations and disadvantages of the related art.

Example embodiments of the present invention provide a secondary charging pad alignment method of measuring an angle and distance from a secondary charging pad of a vehicle to a primary charging pad using signals of hall sensors induced according to a magnetic field at the primary charging pad, thereby aligning the primary charging pad with the secondary charging pad at a vehicle side.

Example embodiments of the present invention also provide a wireless charging control apparatus capable of aligning a secondary charging pad with a primary charging pad of a charger at a vehicle side using a magnetic field caused by a sensing current of the primary charging pad of a charger.

Example embodiments of the present invention also provide a method of operating a charger which supports alignment, performed by a vehicle, of a secondary charging pad loaded in a vehicle with a primary charging pad.

In some example embodiments, a method of wirelessly charging a vehicle, which includes a secondary charging pad alignment method, includes calculating a distance between a center point among a plurality of hall sensors and an angle formed by a center point of a primary coil provided in a charger and one of the plurality of hall sensors based on the center point of the plurality of hall sensors based on changes in levels of signals induced at the plurality of hall sensors due to a magnetic field according to a sensing current applied to the primary coil and adjusting a steering angle of the vehicle according to the calculated angle and distance. The induced signals may include a voltage, a current, or a combination thereof.

Here, the method of wirelessly charging the vehicle may further include, before the calculating, requesting the primary coil information from the charger and receiving primary coil information from the charger. The primary coil information may include a type of the primary coil and levels of power and a sensing current transmitted from the primary coil.

Here, in the calculating, distances between the plurality of hall sensors and a center point of the primary coil may be estimated by comparing levels and patterns of signals induced at the respective hall sensors.

Here, in the calculating, a distance between the center point of the plurality of hall sensors and the center point of the primary coil may be calculated using the estimated distances between the plurality of hall sensors and the center point of the primary coil and preset distances among the plurality of hall sensors.

Here, in the calculating, a distance between the center point of the plurality of hall sensors and a center point of a secondary coil may be calculated using preset distances between the plurality of hall sensors and the center point of the secondary coil and the distances among the plurality of hall sensors.

Here, in the calculating, a distance between the center point of the primary coil and the center point of the secondary coil may be calculated using the distance between the center point of the plurality of hall sensors and the center point of the primary coil and the distance between the center point of the plurality of hall sensors and the center point of the secondary coil.

Here, in the calculating, the angle formed by the center point of the primary coil and the one of the plurality of hall sensors based on the center point of the plurality of hall sensors may be calculated using the estimated distances between the plurality of hall sensors and the center point of the primary coil and the preset distances between the plurality of hall sensors.

Here, in the calculating, an angle formed by the center point of the plurality of hall sensors and the center point of the secondary coil based on the center point of the plurality of hall sensors may be calculated using the preset distances between the plurality of hall sensors and the center point of the secondary coil and the distances among the plurality of hall sensors.

Here, in the calculating, an angle formed by the center point of the primary coil and the center point of the secondary coil based on the center point of the plurality of hall sensors may be calculated using the angles formed by the center point of the primary coil and the plurality of hall sensors based on the center point of the plurality of hall sensors and the angle formed by the center point of the plurality of hall sensors and the center point of the secondary coil based on the center point of the plurality of hall sensors.

Here, the method of wirelessly charging the vehicle may further include adjusting the distance between the center point between the plurality of hall sensors and the center point of the primary coil and the angle formed by the center point of the primary coil and the one of the plurality of hall sensors based on the center point between the plurality of hall sensors as the vehicle moves using the steering angle adjusted in the adjusting operation and the level of the signal induced at the secondary coil changes.

Here, the method of wirelessly charging the vehicle may further include, after the adjusting, measuring a voltage or a current induced at the secondary coil and calculating a point at which a power coupling coefficient between the primary coil and the secondary coil according to the measured voltage and current.

Here, in the correcting, when the type of the primary coil differs from a type of the secondary coil based on primary coil information received from the charger, the distance between the center point of the primary coil and the center point of the secondary coil and the angle formed by the center point of the primary coil and the center point of the secondary coil based on the center point between the plurality of hall sensors may be additionally corrected.

Here, the method of wirelessly charging the vehicle may further include readjusting the steering angle of the vehicle according to the adjusted distance and angle. The readjusting may further include calculating the steering angle based on one or more of the adjusted distance and angle, a current position of the vehicle, a vehicle speed, a yaw rate, the steering angle, and a change gear step to readjust.

Here, the method of wirelessly charging the vehicle may further include adjusting a steering wheel according to steering information or the steering angle.

Here, the method of wirelessly charging the vehicle may further include, when a level of the voltage induced at the secondary coil is greater than a first preset reference voltage in the adjusting, readjusting the distance between the center point between the plurality of hall sensors and the center point of the primary coil based on the voltages induced at the plurality of hall sensors and the angle formed by the center point of the primary coil and the one of the plurality of hall sensors based on the center point between the plurality of hall sensors.

In other example embodiments, a secondary charging pad alignment method includes monitoring signals induced at a plurality of hall sensors arranged in a vehicle, estimating a position of a primary charging pad of a charger based on measured values of the plurality of hall sensors, and generating one of movement information for moving a secondary charging pad disposed in the vehicle to the estimated position of the primary charging pad and steering information of the vehicle corresponding to the movement information. The measured values may include a voltage, a current, or a combination thereof.

Here, the secondary charging pad alignment method may further include, before the generating of the steering information, correcting the estimated position of the primary charging pad according to a level of one of a voltage and a current induced at the secondary charging pad due to a sensing current of a primary coil of the primary charging pad. The estimating of the position of the primary charging pad may be identical to estimating a position of the primary coil, and the adjusting of the estimated position of the primary charging pad may be identical to adjusting the estimated position of the primary coil.

Here, the secondary charging pad alignment method may further include, before the monitoring of the signals, receiving primary coil information from the charger. The primary coil information may include a type of the primary coil, a level of a sensing current which flows through the primary coil, and a level of power transmitted from the primary coil.

Here, the secondary charging pad alignment method may further include, before the generating of the steering information, correcting the estimated position of the primary charging pad using an offset correction value set according to the type of the primary coil.

Here, the secondary charging pad alignment method may further include, after the generating of the steering information, estimating the position of the primary charging pad again based on the measured values of the plurality of hall sensors, which change according to the movement of the secondary charging pad, and analyzing a power coupling profile between the primary charging pad and the secondary charging pad after the estimating the position of the primary charging pad again. It may be identical to analyzing a power coupling profile between the primary coil and a secondary coil.

Here, the secondary charging pad alignment method may further include one of alignment information for aligning the secondary charging pad with a point at which a power coupling coefficient between the primary charging pad and the secondary charging pad is maximum according to a result of analyzing the power coupling profile and accurate steering information of the vehicle corresponding to the alignment information.

Here, the secondary charging pad alignment method may further include calculating a steering angle of the vehicle based on one of the steering information and the accurate steering information.

In still other example embodiments, a wireless charging control apparatus includes a measurement portion which monitors signals induced at a plurality of hall sensors arranged in a vehicle, an estimation portion which estimates a position of a primary charging pad of a charger based on measured values of the plurality of hall sensors, and a generation portion which generates one of movement information for moving a secondary charging pad disposed in the vehicle to the estimated position of the primary charging pad and steering information of the vehicle corresponding to the movement information.

Here, the wireless charging control apparatus may further include a correction portion which corrects the estimated position of the primary charging pad using an offset correction value preset according to a type of a primary coil of the primary charging pad in primary coil information received from the charger.

Here, the wireless charging control apparatus may further include a correction portion which corrects the estimated position of the primary charging pad according to a level of one of a voltage and a current induced at the secondary charging pad due to a sensing current of a primary coil of the primary charging pad.

Here, the wireless charging control apparatus may further include an analysis portion which analyzes a power coupling profile between the primary charging pad and the secondary charging pad. The correction portion, after the steering information is generated by the generation portion, may estimate the position of the primary charging pad again based on the measured values of the plurality of hall sensors, which change according to the movement of the secondary charging pad.

Here, the wireless charging control apparatus may further include an adjustment portion which generates one of alignment information for aligning the secondary charging pad with a point at which a power coupling coefficient between the primary charging pad and the secondary charging pad is maximum according to a result of analyzing the power coupling profile and accurate steering information of the vehicle corresponding to the alignment information.

Here, the adjustment portion may output steering angle information of the vehicle, corresponding to one of the steering information and the accurate steering information to one of a vehicle controller, the secondary charging pad, and the primary charging pad.

Here, the plurality of hall sensors may include two or more of a first hall sensor, a second hall sensor spaced a first distance from the first hall sensor, a third hall sensor spaced a certain distance or farther from the first and second hall sensors, and a fourth hall sensor spaced the certain distance or farther from the first to third hall sensors. One of the first distance and the certain distance may be greater than a longest longitudinal length of the secondary charging pad In yet other example embodiments, a method of operating a charger includes opening a communication channel with a wireless charging control apparatus of a vehicle and applying a sensing current to a primary coil of a primary charging pad adjacent to the vehicle.

Here, the method of operating the charger may further include, before the applying of the sensing current, transmitting primary coil information to the wireless charging control apparatus of the vehicle. The primary coil information may include a type of the primary coil, a level of the sensing current, a level of power transmitted from the primary coil, or a combination thereof.

Here, the method of operating the charger may further include, after the applying of the sensing current, comparing a present power coupling coefficient between the primary charging pad and a secondary charging pad of the vehicle with a reference power coupling coefficient.

Here, the method of operating the charger may further include controlling an operation of the primary charging pad to apply the sensing current to the primary charging pad when the power coupling coefficient is the reference power coupling efficient or less. 친

Here, the opening of the communication channel may be performed by transmitting and receiving messages between the vehicle and the charger based on a beacon signal of one of the vehicle and the charger.

BRIEF DESCRIPTION OF DRAWINGS

Example embodiments of the present invention will become more apparent by describing in detail example embodiments of the present invention with reference to the accompanying drawings, in which:

FIGS. 2A and 2B are views illustrating positions of a primary charging pad, a secondary charging pad, and a plurality of hall sensors, and signals induced at the respective hall sensors, which are used in a secondary charging pad alignment method according to one embodiment of the present invention;

FIGS. 6 to 8 are flowcharts illustrating main processes of the secondary charging pad alignment method of FIG. 5;

DESCRIPTION OF EXAMPLE EMBODIMENTS

Figure 1:
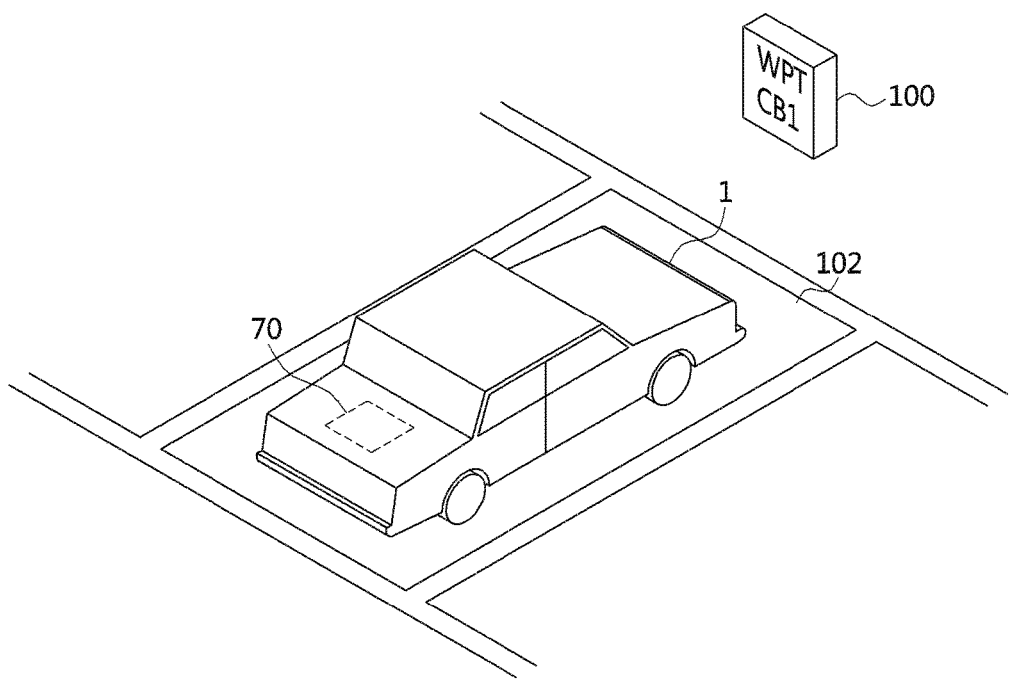
FIG. 1 is a view of a wireless charging system according to one embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present invention, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present invention. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Hereinafter, example embodiments of the present invention will be described in detail with reference to the attached drawings.

FIG. 1 is a view of a wireless charging system according to one embodiment of the present invention.

Referring to FIG. 1, the wireless charging system using a secondary charging pad alignment method according to the present embodiment includes a charger 100, a primary charging pad connected to the charger 100, and a wireless charging control apparatus 70 mounted on a vehicle 1. The vehicle 1 is located in a parking area 102 in which the primary charging pad are installed. The primary charging pad may include a primary coil 10 (refer to FIG. 2A) and is located below the vehicle 1 and not shown in FIG. 1.

Also, the wireless charging system includes a plurality of hall sensors 30, 40, 50, and 60 (refer to FIG. 2A) arranged in the vehicle 1 and a secondary charging pad disposed in the vehicle 1. The secondary charging pad may include a secondary coil 20 (refer to FIG. 2A).

In the wireless charging system according to the present embodiment, the wireless charging control apparatus 70 may monitor signals induced at a plurality of hall sensors using a sensing current transmitted from the primary charging pad, may estimate a position of the primary charging pad based on measured values of the plurality of hall sensors, and then may generate information for moving the secondary charging pad to the estimated position of the primary charging pad.

Here, the information may be control information of a driving apparatus or actuator to directly move a secondary charging pad or may be steering information of a vehicle on which the secondary charging pad is mounted to move the vehicle. The control information of the driving apparatus may correspond to motion information or movement information of the secondary charging pad.

Also, the wireless charging control apparatus 70 may open a communication channel with the charger 100. The communication channel may be performed through wireless near field communication or may be performed based on a beacon signal of the charger 100 or wireless charging control apparatus. The beacon signal may include identification information or wireless communication identifier of the charger 100 or wireless charging control apparatus.

Also, the charger 100 may recognize the vehicle 1 which enters the parking area 102 or opens the communication channel with the wireless charging control apparatus 70 of the vehicle 1 and then may apply a sensing current to a secondary coil 20 of a secondary charging pad adjacent to the vehicle 1.

In the following description, terms related to a primary charging pad, a primary coil 10, a secondary charging pad, and a secondary coil 20 may be alternatively used as a transmitting pad, a transmitting coil, a receiving pad, and a receiving coil in an order of being mentioned.

Figure 2A:
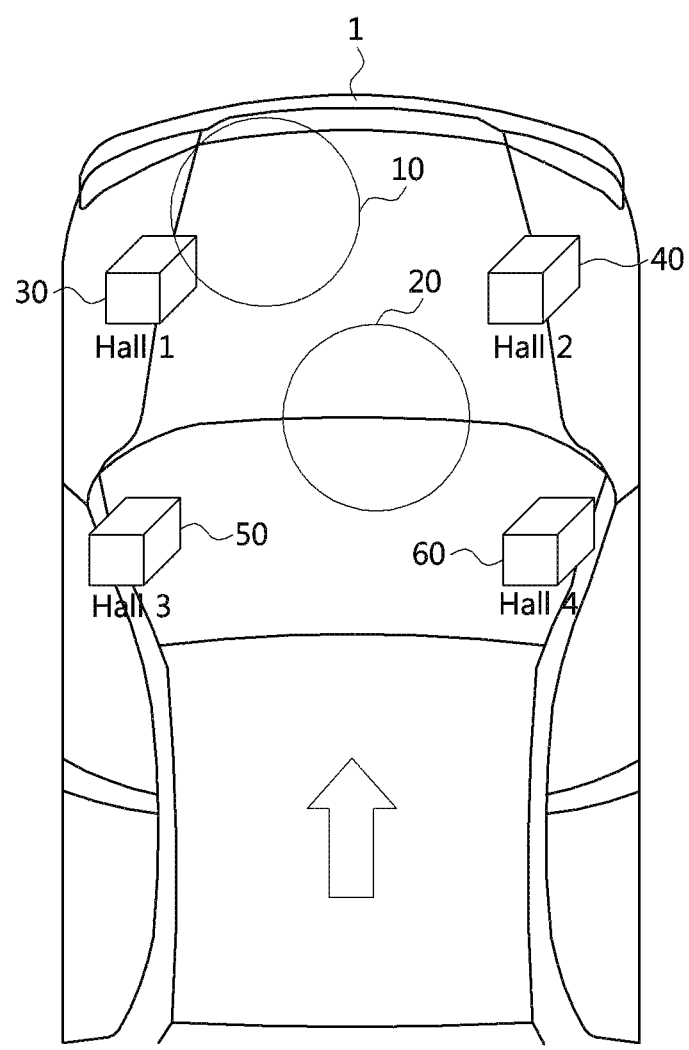

FIGS. 2A and 2B are views illustrating positions of the primary charging pad, the secondary charging pad, and the plurality of hall sensors, and signals induced at the respective hall sensors which are used in the secondary charging pad alignment method according to one embodiment of the present invention.

Referring to FIG. 2A, a coil of a secondary charging pad 20 (hereinafter, referred to as a secondary coil) and a plurality of hall sensors hall1, hall2, hall3, and hall4 are provided in the vehicle 1 and a coil 10 (hereinafter, referred to as a primary coil) is provided in a primary charging pad connected to a charger 100.

When the vehicle 1 is located with respect to the primary coil 10 as shown in FIG. 2A, induced voltages measured at the plurality of hall sensors 30, 40, 50, and 60 are as shown in FIG. 2B. That is, the induced voltages measured by the respective hall sensors 30, 40, 50, and 60 change according to a distance and angle from the primary coil 10.

As described above, the wireless charging control apparatus may calculate an angle and distance between the primary coil 10 and the secondary coil 20 by comparing the intensity and pattern of the induced signals of the plurality of hall sensors 30, 40, 50, and 60. Comparison and calculation may be performed by the wireless charging control apparatus mounted on the vehicle 1. The wireless charging control apparatus may be implemented as one of vehicle controllers.

The number of the plurality of hall sensors 30, 40, 50, and 60 provided in the vehicle 1 is not limited to that of the embodiment shown in FIG. 2A. Also, positions of the plurality of hall sensors 30, 40, 50, and 60 may be preset together with a position of the secondary coil 20. That is, distances and angles between the plurality of hall sensors 30, 40, 50, and 60 and the secondary coil 20 may be preset.

Merely, to effectively detect the primary coil 10 through which the sensing current flows based on an electric field generated by the sensing current of the charger 100, the plurality of hall sensors 30, 40, 50, and 60 may be disposed to surround the secondary coil 20. For example, the plurality of hall sensors 30, 40, 50, and 60 may be arranged around the secondary coil 20 to allow at least two of the first hall sensor 30, the second hall sensor 40 spaced a first distance from the first hall sensor 30, the third hall sensor 50 spaced a certain distance or farther from the first and second hall sensors 30 and 40, and the fourth hall sensor 60 space a certain distance or father from the first to third hall sensors 30, 40, and 50 to be used in a detection process. In this case, the first distance or certain distance between the sensors may be longer than a longitudinal length corresponding to a longest width of the secondary coil 20 or the secondary charging pad.

Figure 3:
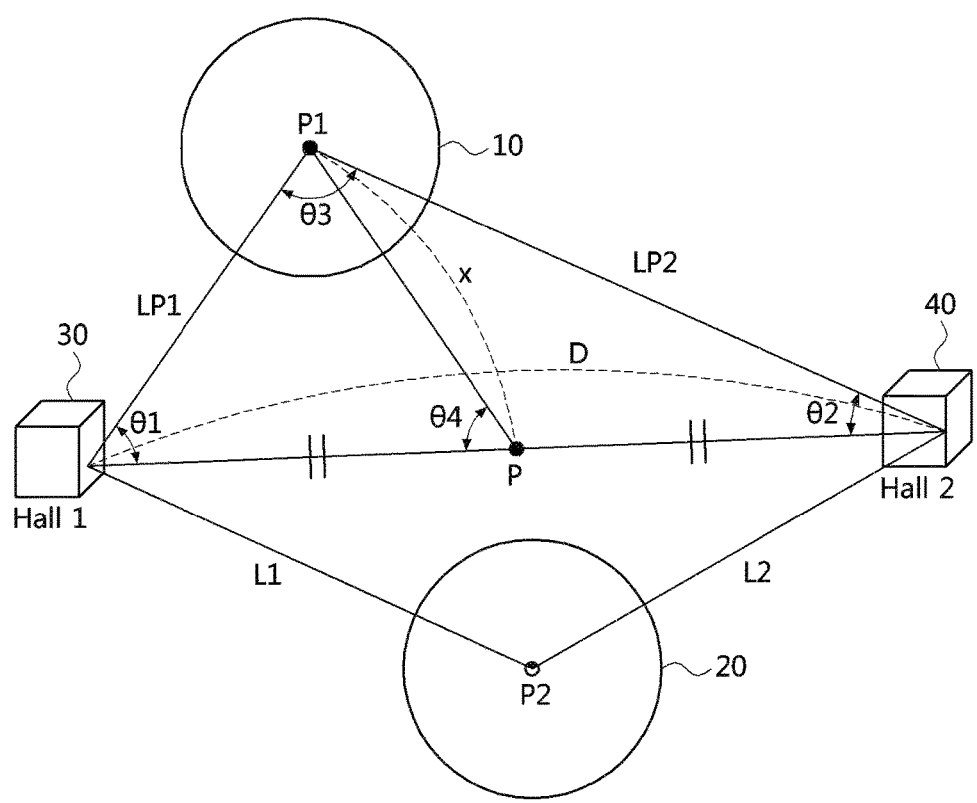
FIG. 3 is a view illustrating a process of calculating an angle and distance from a primary charging pad using hall sensors of a vehicle in the secondary charging pad alignment method according to one embodiment of the present invention.

FIG. 3 is a view illustrating a process of calculating an angle and distance from the primary charging pad using the hall sensors of the vehicle in the secondary charging pad alignment method according to one embodiment of the present invention. The calculation may be performed by the wireless charging control apparatus.

In the present embodiment, a process of calculating positions and angles of the first hall sensor 30 and the second hall sensor 40 among the hall sensors 30, 40, 50, and 60 shown in FIG. 2A, the primary coil 10, and the secondary coil 20 will be described as an example.

Referring to FIG. 3, the wireless charging control apparatus connected to the first hall sensor 30 may estimate a distance LP1 between a center point P1 of the primary coil 10 and the first hall sensor 30. Also, the wireless charging control apparatus connected to the second hall sensor 40 may estimate a distance LP2 between the center point P1 of the primary coil 10 and the second hall sensor 40. According to levels of peak points of signals induced at the respective hall sensors, for example, voltages, the distances LP1 and LP2 may be estimated.

The wireless charging control apparatus may calculate a center point P2 between the first hall sensor 30 and the second hall sensor 40. Since a distance D between the first hall sensor 30 and the second hall sensor 40 is a preset value, a distance D/2 between the first hall sensor 30 and the center point P2 and a distance D/2 between the second hall sensor 40 and the center point P2 may be simply calculated.

Based on the signals induced at the plurality of hall sensors 30 and 40, a position of a center point P between the plurality of hall sensors 30 and 40, and the respective distances LP1 and LP2 between the plurality of hall sensors 30 and 40 and the primary coil 10, the wireless charging control apparatus may calculate a distance x between the center point P and the center point P1 of the primary coil 10. Also, based on a calculated distance between the center point P and primary coil 10 and a preset distance between the center point P2 and the secondary coil 20, a distance between the primary coil 10 and the secondary coil 20 may be calculated.

Also, the wireless charging control apparatus may calculate angles θ1 and θ2 formed by the plurality of hall sensors 30 and 40 and the center point P1 of the primary coil 10 and an angle θ4 formed by the center point P and the center point P1 of the primary coil 10 according to the distances LP1 and LP2 of the plurality of hall sensors 30 and 40 and the primary coil 10 and the distances D/2 between the center point P between the plurality of hall sensors 30 and 40 and the plurality of hall sensors 30 and 40.

After that, the wireless charging control apparatus may calculate an angle formed by the primary coil 10, the center point P, and the secondary coil 20 based on the calculated angle θ4 formed by the center point P and the center point P1 of the primary coil 10 and an angle formed by the center point P and the center point P2 of the secondary coil 20.

For example, since values of LP1, LP2, and D have been known in FIG. 3, the wireless charging control apparatus may calculate the angle θ1 formed by the first hall sensor 30 and the center point P1 of the primary coil 10 based on a straight line which connects the first hall sensor 30 and the second hall sensor 40 and the angle θ2 formed by the second hall sensor 40 and the center point P1 of the primary coil 10 based on the straight line which connects the first hall sensor 30 and the second hall sensor 40.

As described above, the wireless charging control apparatus may calculate the angle θ1 formed by the first hall sensor 30 and the center point P1 of the primary coil 10 and the angle θ2 formed by the second hall sensor 40 and the center point P1 of the primary coil 10 and may calculate an angle θ3 formed by the first hall sensor 30 and the second hall sensor 40 at the center point P1 of the primary coil 10.

Also, the wireless charging control apparatus may calculate the angle θ4 formed by the center point P and the center point P1 of the primary coil 10 based on a distance between the center point P1 of the primary coil 10 and the center point P between the first hall sensor 30 and the second hall sensor 40 and the straight which connects the first hall sensor 30 and the second hall sensor 40.

The distance and angle between the primary coil 10 and the secondary coil 20 are determined based on the first hall sensor 30 and the second hall sensor 40 because the voltages are induced only to the first hall sensor 30 and the second hall sensor 40 as shown in FIG. 2B. The distance and angle between the primary coil 10 and the secondary coil 20 may be estimated using hall sensors from which induced voltages are detected as described above.

Figure 4:
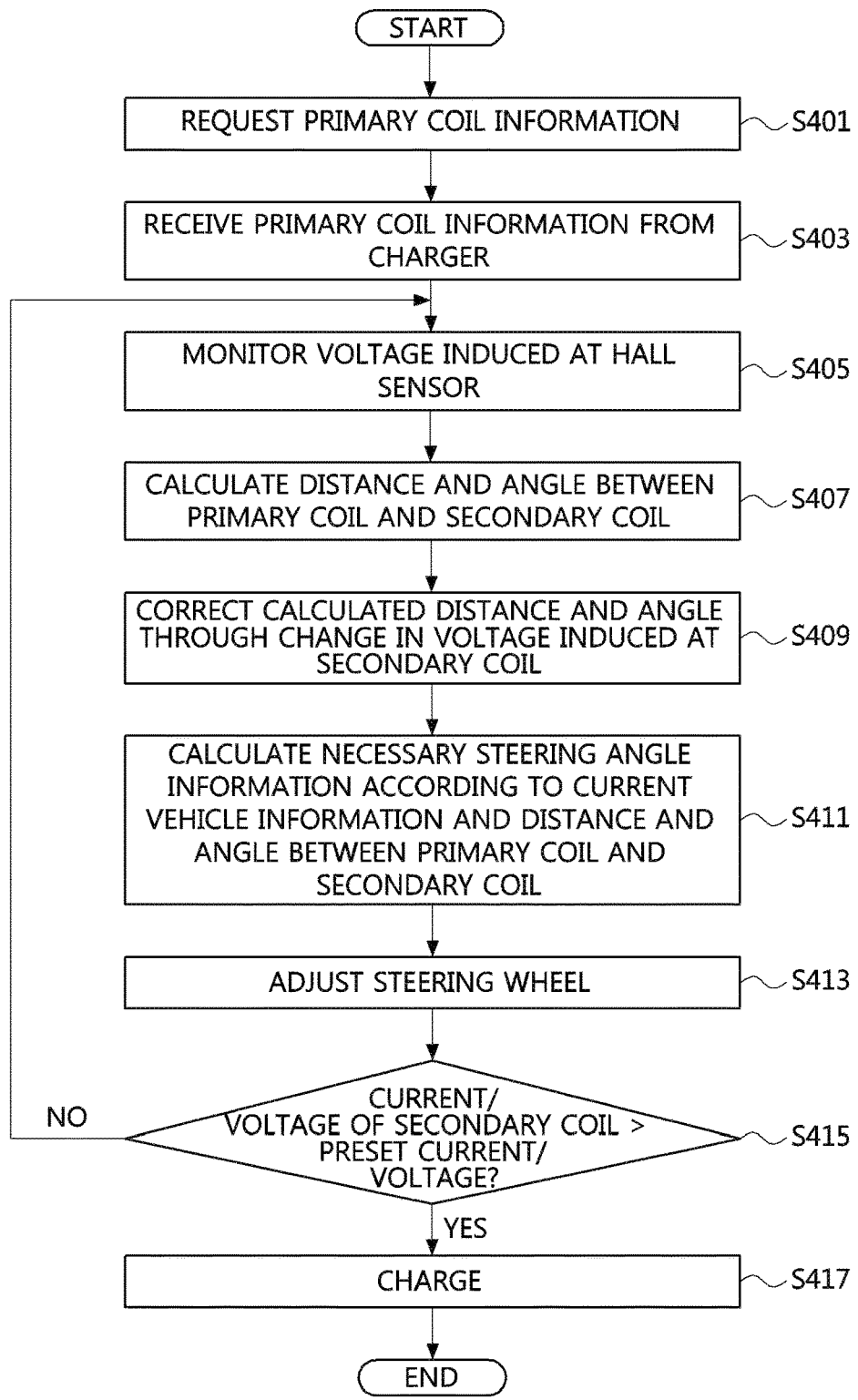
FIG. 4 is a flowchart illustrating the secondary charging pad alignment method according to one embodiment of the present invention.

FIG. 4 is a flowchart illustrating the secondary charging pad alignment method according to one embodiment of the present invention.

Referring to FIG. 4, the secondary charging pad alignment method according to the present embodiment will be described as follows.

First, the wireless charging control apparatus requests information on the primary coil 10 of the charger 100 from the charger 100 (S401).

Next, the wireless charging control apparatus receives the information on the primary coil 10 transmitted from the charger 100 (S403). The information on the primary coil 10 may include a type of the primary coil 10 such as an oval or circular shape, power transmitted from the primary coil 10 of the charger 100, and a level of a sensing current which flows through the primary coil 10.

Next, the wireless charging control apparatus may monitor the sensing current which flows through the primary coil 10 and signals induced at the hall sensors due to a magnetic field according thereto (S405). An example of the signals induced at the plurality of hall sensors may include the induced voltages as shown in FIG. 2B. According to which pattern is included in the signal and according to which hall sensor induces the signal, a distance from the hall sensor to the primary coil may be estimated.

Next, the wireless charging control apparatus may estimate a distance between the hall sensor which induces a signal having a certain level or pattern and the primary coil 10 and may calculate an angle between the primary coil 10 and the secondary coil 20 according to the estimated distance (S407). A detailed calculation method has been described above with reference to FIG. 3.

Next, the wireless charging control apparatus may correct the calculated distance and angle in S407 through a change in the signal induced at the secondary coil 20 (S409). A detailed description thereof will be described below with reference to FIG. 7.

Next, the wireless charging control apparatus may calculate steering angle information necessary for moving the secondary charging pad based on the corrected distance and angle and current vehicle information (S411). The current vehicle information may relate to a vehicle speed, yaw rate, steering angle, and change GEAR STEP and may be transmitted from the respective sensors or a vehicle controller to the wireless charging control apparatus through high speed controller area network (CAN) communication. The wireless charging control apparatus which receives this may transmit the calculated steering angle information to the vehicle controller. The transmitted steering angle information may be used to adjust a steering wheel in the vehicle controller (S413). The wireless charging control apparatus may be formed integrally with a certain vehicle controller depending on implementation.

Next, the wireless charging control apparatus may calculate a distance and angle between the primary coil 10 and the secondary coil 20 by analyzing values measured by the hall sensors and then may determine whether voltage/current induced at the secondary coil 20 in a newly changed state (a present state) is greater than preset voltage/current (S415).

Also, when the voltage/current induced at the secondary coil 20 is smaller than the preset voltage/current, the wireless charging control apparatus may return to the monitoring operation and may perform process thereafter to calculate a necessary steering angle and provide the calculated steering angle information again, thereby adjusting the steering wheel.

That is, the wireless charging control apparatus, in line with the adjustment of the vehicle controller with respect to the steering wheel of the vehicle, may adjust the steering wheel according to previously calculated necessary steering angle information and accordingly may align the secondary coil 20 with the primary coil 10. Also, when the voltage/current induced at the secondary coil 20 becomes greater than the preset voltage/current as the secondary coil 20 becomes aligned with the primary coil 10, the wireless charging control apparatus may start wireless charging (S417). The wireless charging control apparatus may start the charging after determining whether power appropriate for charging is coupled and whether alignment is complete to be appropriate for charging.

The preset voltage/current may be set as the voltage/current of the secondary coil 20 determined as alignment is complete to be appropriate for charging. When a level of the voltage/current induced at the secondary coil 20 is smaller than that of the preset voltage/current, signals induced at the hall sensors may be monitored again, a distance and angle between the primary coil 10 and the secondary coil 20 may be calculated, the calculated distance and angle may be corrected using a change in a signal induced at the secondary coil 20, necessary steering angle information may be calculated based on the corrected distance and angle and current vehicle information, the steering wheel may be adjusted, a current and voltage of the secondary coil 20 may be compared with the preset current and voltage, and charging may be performed when the current and voltage of the secondary coil 20 are greater than the preset current and voltage.

Figure 5:
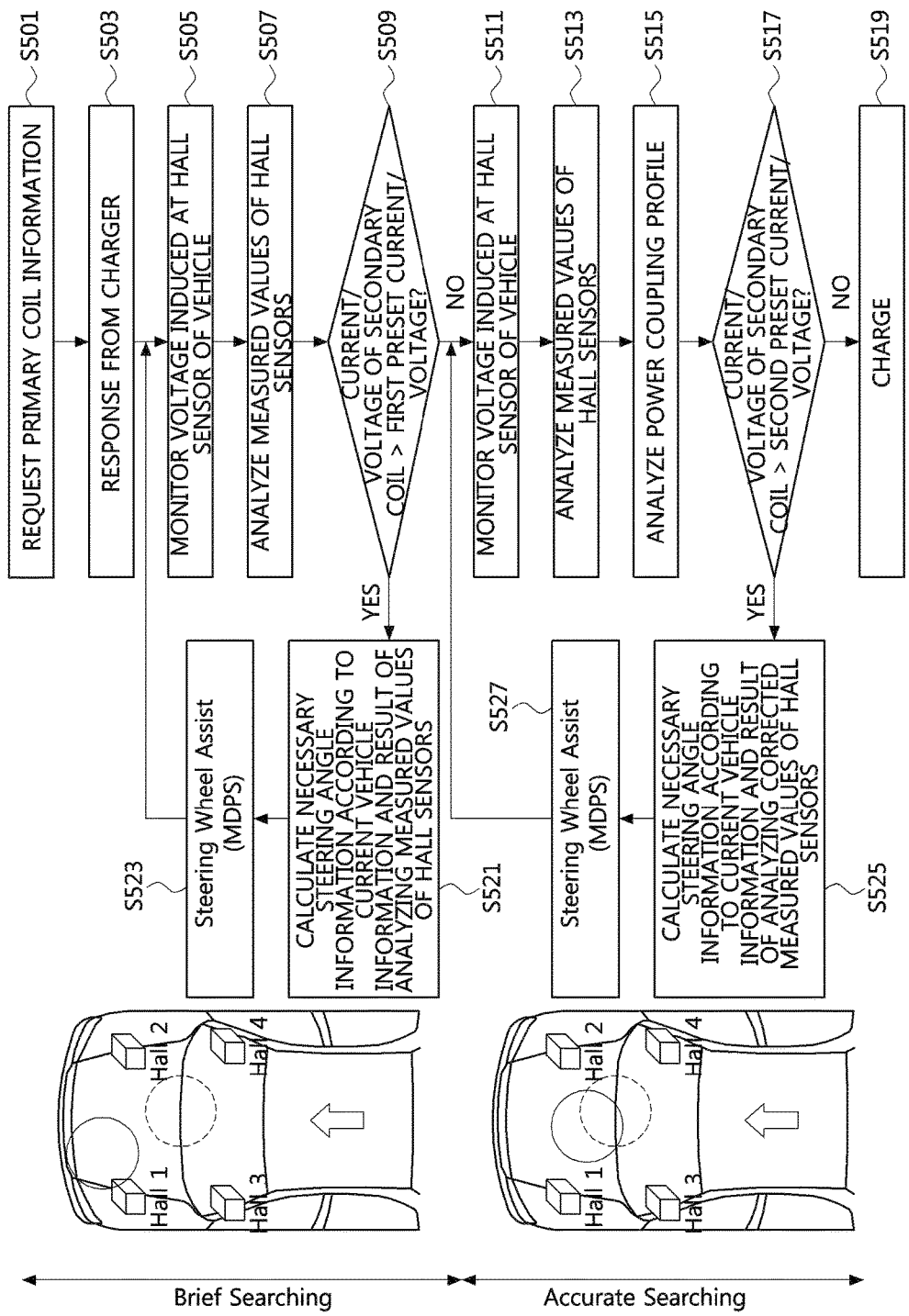
FIG. 5 is a flowchart illustrating a secondary charging pad alignment method according to another embodiment of the present invention.

FIG. 5 is a flowchart illustrating a secondary charging pad alignment method according to another embodiment of the present invention.

The secondary charging pad alignment method according to the present embodiment may correspond to dividing the secondary charging pad alignment method of FIG. 4 into two stages. The two stages include primary alignment or brief searching and secondary alignment or accurate searching.

In the brief searching, the secondary coil 20 is aligned with the primary coil 10 at a level of using the signal induced at the secondary coil 20 according to generally measured values of the hall sensors and depending on additional implementation. Also, in the accurate searching, the secondary coil 20 is accurately aligned with the primary coil 10 by basically using voltages or currents of the hall sensors and analyzing the signal induced at the secondary coil 20 and/or power coupling profile.

In the brief searching, the wireless charging control apparatus may request information on the primary coil 10 of the charger 100 from the charger 100 (S501). The wireless charging control apparatus may receive information on the primary coil 10 through a response signal of the charger 100 (S503). The information on the primary coil 10 may include a type of the primary coil 10 such as an oval or circular shape, power transmitted from the charger 100, and a level of a sensing current which flows through the primary coil 10.

Next, the wireless charging control apparatus may monitor the sensing current which flows through the primary coil 10 and signals induced at the hall sensors due to a magnetic field according thereto (S505). The signals induced at the plurality of hall sensors may be voltages as shown in FIG. 2B.

Next, the wireless charging control apparatus analyzes measured values of the hall sensors (S507). The wireless charging control apparatus may estimate a distance from the hall sensor to the primary coil 10 according to which pattern is included in the signal and according to which hall sensor induces the signal. The wireless charging control apparatus may calculate a distance and angle between the primary coil 10 and the secondary coil 20 according to an estimated distance between the hall sensor and the primary coil 10. A detailed calculation method thereof is identical as described above with reference with FIG. 3.

Next, the wireless charging control apparatus may calculate the distance and angle between the primary coil 10 and the secondary coil 20 and then may compare levels of current/voltage applied to the secondary coil 20 with those of first preset current/voltage (S509). When the current/voltage induced according to the sensing current which flows through the primary coil 10 are greater than the first current/voltage, it is possible to determine that the primary coil 10 and the secondary coil 20 are partially aligned with each other. That is, the levels of the first current/voltage may be set to determine that the primary coil 10 and the secondary coil 20 start to partially overlap each other.

For example, the levels of the current/voltage induced at the secondary coil 20 are smaller than those of the first current/voltage, based on current vehicle information and the calculated distance and angle between the secondary coil 20 and the primary coil 10, steering angle information necessary for moving the secondary coil 20 may be calculated (S521) and the steering wheel may be adjusted according to the calculated steering angle information (S523).

The vehicle is moved by adjusting the steering wheel, and levels or patterns of signals induced at the hall sensors are measured to analyze measured values of the hall sensors. After that, when the levels of the current/voltage induced at the secondary coil 20 are greater than the first current/voltage, the accurate searching may be performed at last.

In the accurate searching, the wireless charging control apparatus may monitor a sensing current which flows through the primary coil 10 and the signals induced due to a magnetic field according thereto by the plurality of hall sensors and the secondary coil 20 of the secondary charging pad (S511). An example of the signals induced at the plurality of hall sensors is as shown in FIG. 2B.

Next, the wireless charging control apparatus analyzes measured values of the hall sensors (S513). The wireless charging control apparatus may estimate distances from the hall sensor to the primary coil 10 according to which pattern is included in the signal and according to which hall sensor induces the signal. The wireless charging control apparatus may calculate a distance and angle between the primary coil 10 and the secondary coil 20 according to the estimated distances between the hall sensors and the primary coil 10. Detailed distance and angle calculation has been described above with reference to FIG. 3.

Next, the wireless charging control apparatus may correct the previously calculated distance and angle between the primary coil 10 and the secondary coil 20 through power coupling profile analysis (S515). The operation S515 may correspond to the correction operation S409 of FIG. 4 but is not limited thereto. The power coupling profile analysis will be described below with reference to FIG. 7. In the operation S515, in a state in which the more accurately corrected distance and angle between the primary coil 10 and the secondary coil 20 are calculated, the wireless charging control apparatus may determine whether the levels of the current/voltage presently induced at the secondary coil 20 are greater than those of preset second current/voltage (S517). The operation S517 may correspond to the correction operation S415 of FIG. 4 but is not limited thereto.

Next, when the levels of the current/voltage induced at the secondary coil 20 are those of the second current/voltage or less, the wireless charging control apparatus may calculate necessary steering angle information based on current vehicle information (S525) and may adjust the steering wheel according a calculation result (S527). Also, the process may return to the monitoring operation S511.

Meanwhile, when the levels of the current/voltage induced at the secondary coil 20 are greater than those of the second current/voltage (S517), the wireless charging control apparatus may start charging (S519).

Figure 8:
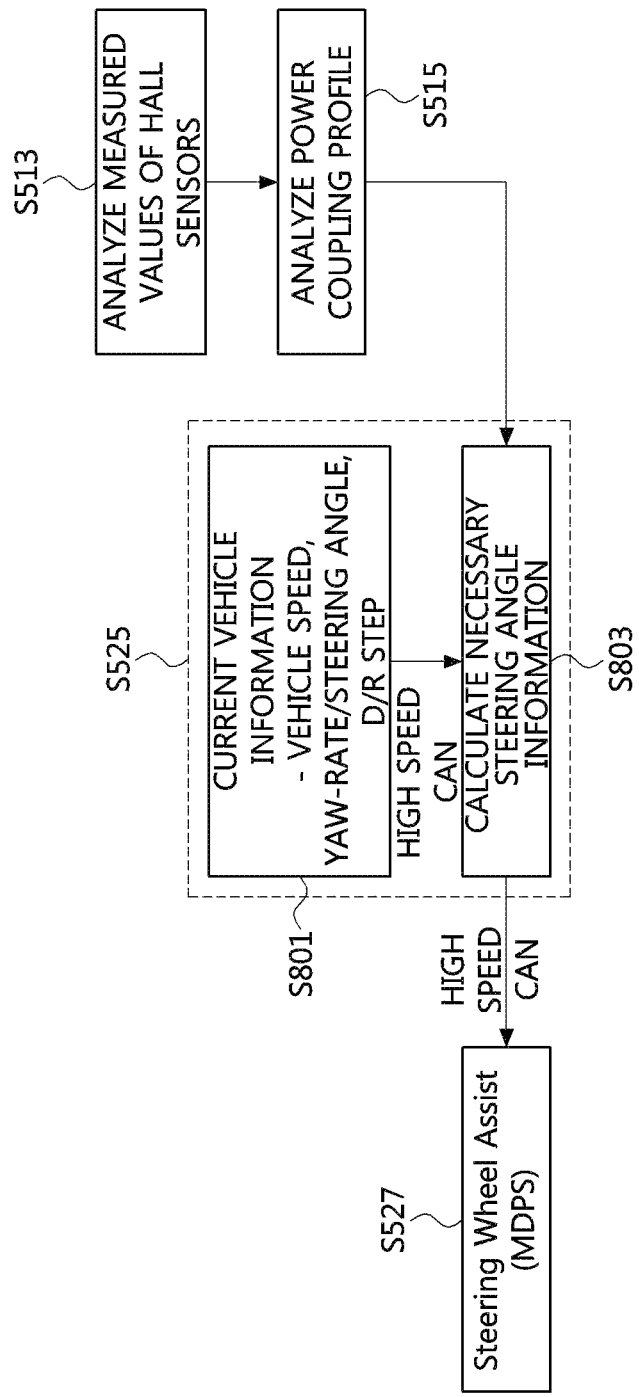

FIGS. 6 to 8 are flowcharts illustrating main processes of the secondary charging pad alignment method of FIG. 5. FIG. 7 may illustrate the correction operation S409 in the secondary charging pad alignment method of FIG. 4 or the correction operation S515 in the secondary charging pad alignment method of FIG. 5 in detail.

Referring to FIG. 6, the wireless charging control apparatus may analyze hall sensor measured values (S507), may receive the distance and angle between the primary coil 10 and the secondary coil 20 and the current vehicle information such as a vehicle speed, yaw rate, steering angle, and change GEAR STEP through high speed CAN communication (S601), and may calculate necessary steering angle information (S603). The calculated necessary steering angle information is transmitted to a steering wheel controller through the high speed CAN communication, thereby adjusting the steering wheel (S523). The wireless charging control apparatus, according to the analyzing of the hall sensor measured values, may calculate a direction of the primary coil 10, an angle formed by the primary coil 10 in comparison with and the center point P, and a distance between the center point P and the primary coil 10.

Referring to FIG. 7, the wireless charging control apparatus may analyze the hall sensor measured values (S513), may compare current values of the current/voltage induced at the secondary coil 20 with history values thereof (S701), and may correct the angle and distance between the primary coil 10 and the secondary coil 20, which are obtainable through analyzing the hall sensor measured values and may calculate an optimal point of a power coupling profile between the primary coil 10 and the secondary coil 20, at which a coupling coefficient is highest (S703). A calculation result value may be used to calculate the steering angle information (refer to S411 of FIG. 4).

In detail, a current and voltage profile measured according to the movement of the vehicle may continuously change and the wireless charging control apparatus may store the current and voltage profile which changes. Also, the wireless charging control apparatus may correct a hall sensor measured value analysis result by comparing the stored current and voltage profile and a preferable current and voltage profile necessary for wireless charging according the movement of the secondary coil 20.

Referring to FIG. 8, the wireless charging control apparatus may analyze the hall sensor measured value (S513), may correct the distance and angle between the primary coil 10 and the secondary coil 20 through analyzing the power coupling profile (S515) in FIG. 7, may receive the distance and angle between the primary coil 10 and the secondary coil 20 and the current vehicle information such as the vehicle speed, yaw rate, steering angle, and change GEAR STEP through the high speed CAN communication (S801), and may calculate the steering angle information of the vehicle necessary for the moving the secondary coil 20 (S803). The calculated necessary steering angle information may be transmitted to a steering wheel assist device or a motor driven power steering (MDPS) side through the high speed CAN communication, thereby adjusting the steering wheel (S527). Also, the wireless charging control apparatus, according to the analyzing of the hall sensor measured values, may calculate a direction of the primary coil 10, an angle formed by the primary coil 10 in comparison with the center point P, and a distance between the center point P and the primary coil 10 again.

Figure 9:
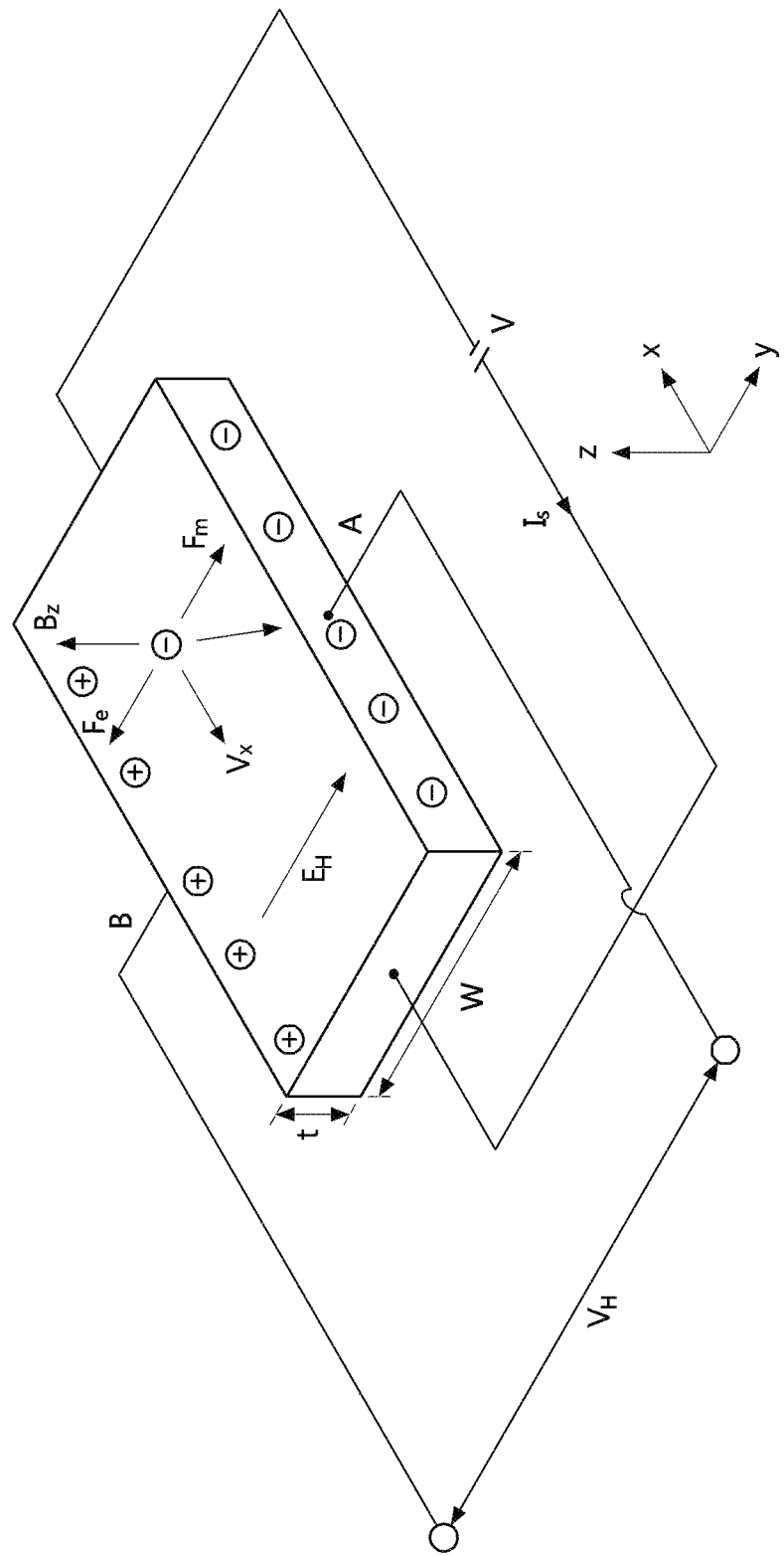
FIG. 9 is a view illustrating hall sensors capable of being coupled with the wireless charging control apparatus and an operation principle thereof according to the embodiment of the present invention.

FIG. 9 is a view illustrating the hall sensors capable of being coupled with the wireless charging control apparatus and an operation principle thereof according to the embodiment of the present invention.

Referring to FIG. 9, when an electric field Bz is applied to a fully long oblong semiconductor specimen in which a current Is flows through the hall sensor in the present embodiment moves in a z-direction, negatively charged electrons move from a B side to an A side due to a magnetic force Fm in a y-direction. Corresponding thereto, positive charges are induced at the B side, thereby inducing a voltage $V_H$ between the A side and the B side of the hall sensor.

As described above, the wireless charging control apparatus may arrange the plurality of hall sensors around the secondary coil 20 of the vehicle and may estimate the position of the primary coil 10 based on the signals induced at the hall sensor due to the electric field of the primary coil 10.

Figure 10:
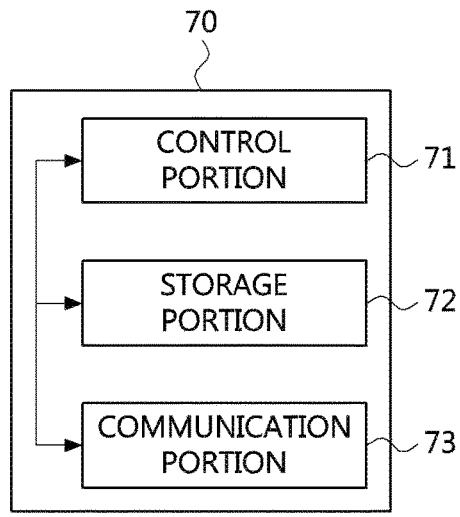
FIG. 10 is a schematic block diagram of a wireless charging control apparatus according to still another embodiment of the present invention.

FIG. 10 is a schematic block diagram of a wireless charging control apparatus 70 according to still another embodiment of the present invention.

Referring to FIG. 10, the wireless charging control apparatus 70 according to the present embodiment includes a control portion 71, a storage portion 72, and a communication portion 73.

The control portion 71 may monitor signals induced at a plurality of hall sensors using a sensing current transmitted from a primary charging pad, may estimate a position of the primary charging pad based on measured values of the plurality of hall sensors, and then may generate information for moving a secondary charging pad to the estimated position of the primary charging pad. The control portion 71 described above may include a processor.

The control portion 71, like a processor, may include one or more cores, a cache memory, a memory interface, and a peripheral interface. The peripheral interface may connect the control portion 71 with an input/output system and several other peripheral devices. The memory interface may connect the control portion 71 with the storage portion 72.

When the control portion 71 includes a multi-core structure, the multi-core may be formed by integrating two or more independent cores into one package formed of a single integrated circuit. Also, the core may include a central processing unit (CPU). The CPU may be formed as a system on chip (SoC) in which a micro control unit (MCU) and a peripheral device that is an integrated circuit for an external expansion device are arranged together but is not limited thereto. Also, the core may include a register which stores a command to be processed, an arithmetic logical unit (ALU) which performs comparison, determination, and calculation, an internal control unit which internally controls the core to analyze and execute the command, and an internal bus.

Also, the control portion 71 may include one or more data processors, image processors, or coder-decoders (CODEC) but is not limited thereto. The data processor, image processor, or CODEC may be an additional component connected to the control portion 71.

The control portion 71 described above may perform data input, data processing, data output to perform the secondary charging pad alignment method by executing several software programs. Also, the control portion 71 may operate a particular software module (an instruction set) stored in the storage portion 72 and may perform several particular functions corresponding to the corresponding module. That is, the control portion 71 may be provided to perform the secondary charging pad alignment method using software modules stored in the storage portion 72 and to perform wireless communication with a charger through the communication portion 73.

The storage portion 72 may store programs or modules for performing the secondary charging pad alignment method. Also, the storage portion 72 may store charger information and may store information on an induced voltage or induced current obtained from a primary coil of the charger. Also, the storage portion 72 may store an offset correction value corresponding to a type of a primary coil included in the charger information as a lookup table. The offset correction value may include an estimated correction value of a preset center point of the primary coil according to the type of the primary coil, for example, a shape such as a circular, quadrangular, and multi coil. The storage portion 72 may include a measurement module, an estimation module, a generation module, a correction module, an offset correction module, an adjustment module, a primary alignment module, a secondary alignment module, an analysis module, a comparison module, or a combination thereof.

The storage portion 72 described above may include a memory. The memory may include a storage medium having the form of a volatile memory such as a random access memory (RAM) and a read-only memory (ROM) or a nonvolatile memory. Also, the storage portion 72, depending on implementation, may include a storage medium such as a floppy disc, a hard disc, a magnetic tape, a compact disc (CD) ROM, and a flash memory.

The communication portion 73 may connect an external charger with the wireless charging control apparatus 70 through a wireless communication channel. The communication portion 73 may include a communication interface or a communication module. The communication interface may support one or more communication protocols to allow a secondary charging pad alignment apparatus to be connected with the charger, a central processing unit (CPU) of a charging station, or other apparatuses on other networks through the network.

Also, the communication portion 73 may include one or more wireless communication subsystems. The wireless communication subsystem may include a radio frequency receiver, a radio frequency transceiver, an optical receiver, for example, an infrared receiver, an optical transceiver, or a combination thereof.

A network accessible by the communication portion 73 describe above, for example, may include a global system for mobile communication (GSM), enhanced data GSM environment (EDGE), code division multiple access (CDMA), wideband CDMA (WCDMA), long term evolution (LTE), LTE-advanced (LTE-A), orthogonal frequency division multiple access (OFDMA), WiMAX, wireless fidelity (Wi-Fi), Bluetooth, etc.

Figure 11:
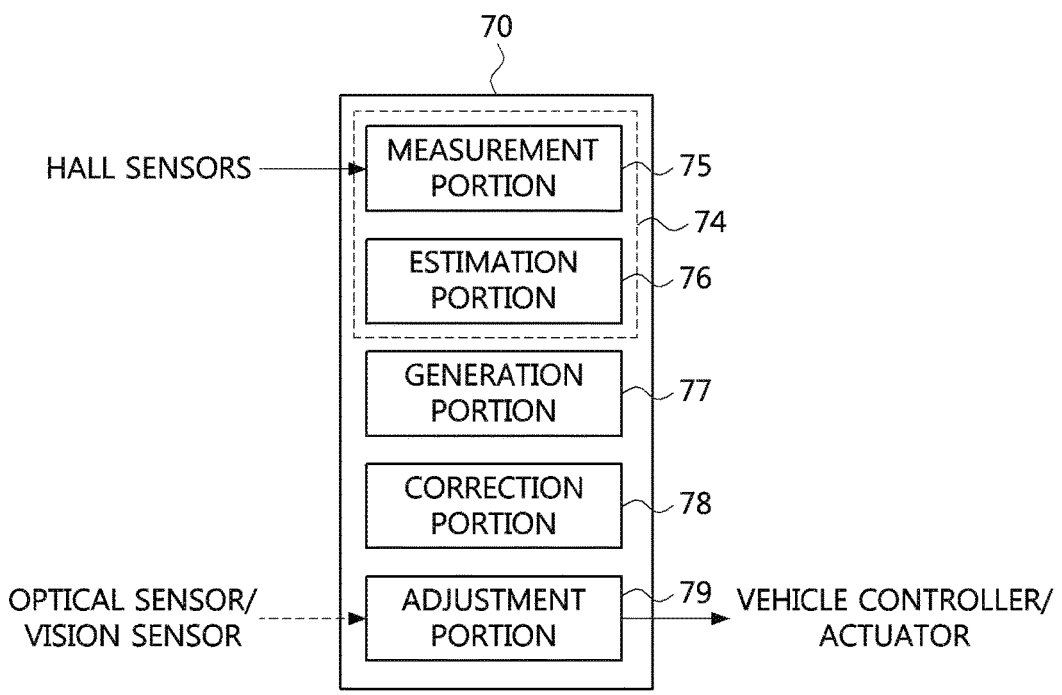
FIG. 11 is a block diagram illustrating an employable configuration for the wireless charging control apparatus of FIG. 10.
Figure 12:
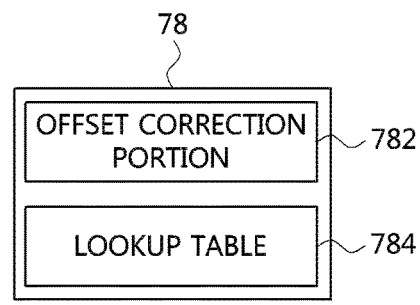
FIG. 12 is a block diagram illustrating main components of the wireless charging control apparatus of FIG. 11.
Figure 13:
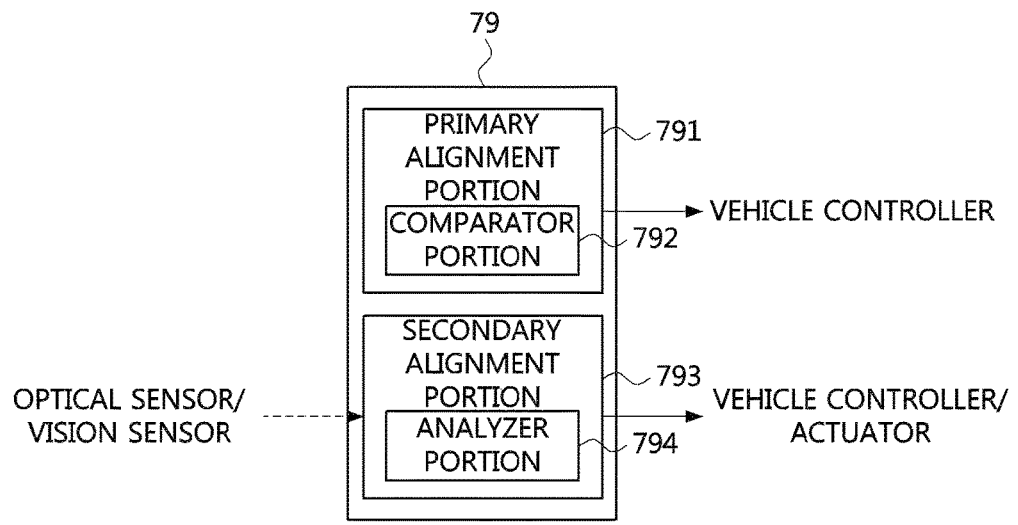
FIG. 13 is a block diagram illustrating other main components of the wireless charging control apparatus of FIG. 11.

FIG. 11 is a block diagram illustrating an employable configuration for the wireless charging control apparatus 70 of FIG. 10. FIG. 12 is a block diagram illustrating main components of the wireless charging control apparatus 70 of FIG. 11. FIG. 13 is a block diagram illustrating other main components of the wireless charging control apparatus 70 of FIG. 11.

Referring to FIG. 11, the wireless charging control apparatus 70 according to the present embodiment includes a measurement portion 75, an estimation portion 76, a generation portion 77, a correction portion 78, and an adjustment portion 79.

The measurement portion 75 may include a device which monitors signals induced at a plurality of hall sensors arranged in a vehicle or a configuration portion which performs a function corresponding to the device. The measurement portion 75 may include a voltmeter coupled with a secondary coil.

The estimation portion 76 may include a device which estimates a position of a primary charging pad of the charger based on measured values of the plurality of hall sensors or a configuration portion which performs a function corresponding to the device. The estimation portion 76, for example, may estimate whether induced voltages which correspond to a lowest reference voltage or more occur at the plurality of hall sensors and may estimate a relative position of the primary coil using levels of voltages of the respective hall sensors. The estimation portion 76 may include a comparator and a relative position calculator.

A combination of the measurement portion 75 and the estimation portion 76 described above may be referred to as the calculator 74.

The generation portion 77 may include a device which generates movement information for moving the secondary charging pad disposed in the vehicle to an estimated position of the primary charging pad or steering information corresponding to the movement information or a configuration portion which performs a function corresponding to the device.

The correction portion 78 may include a device or configuration portion which corrects the estimated position of the primary charging pad using a preset offset correction value which is preset as a lookup table depending on a type of the primary coil of the primary charging pad in primary coil information received from the charger. The correction portion described above, as shown in FIG. 12, may include an offset correction portion 782 and a lookup table 784.

Also, the correction portion 78 may include a device or configuration portion which corrects the estimated position of the primary charging pad according to a level of a voltage or current induced at the secondary charging pad due to a sensing current of the primary coil of the primary charging pad. The correction portion 78, after the generation portion 77 generates the steering information, may estimate the position of the primary charging pad again based on measured values of the plurality of hall sensors, which change according to the movement of the secondary charging pad.

The adjustment portion 79 may include a device or configuration portion which corrects the estimated position of the primary coil based on signals induced at the secondary coil after the estimation portion 76 estimates the position of the primary coil based on the measured values of the plurality of hall sensors. Also, the adjustment portion 79 may include a device or configuration portion which generates alignment information for aligning the secondary charging pad with a point at which a power coupling coefficient between the primary charging pad and the secondary charging pad is maximum according to a result of analyzing a power coupling profile of an analyzer 794 (refer to FIG. 13) or accurate steering information of the vehicle corresponding to the alignment information.

The adjustment portion 79 described above, as shown in FIG. 13, may include a primary alignment portion 791 and a secondary alignment portion 793. The primary alignment portion 791 may include a comparator 792 for comparing a measured value of a signal induced at the hall sensor or the secondary coil with a reference value. Also, the secondary alignment portion 793 may include the analyzer 794 for analyzing or comparing the power coupling coefficient with a reference power coupling coefficient. Also, depending on implementation, the secondary alignment portion 793 may receive a signal from the optical sensor or a vision sensor and may more accurately align the secondary coil with the primary coil additionally using the signal. The adjustment portion 79 may transmit steering information generated in a brief searching process of the primary alignment portion 791 or accurate steering information generated in an accurate searching process of the secondary alignment portion 793 to a vehicle controller or an actuator connected to the secondary charging pad or the primary charging pad.

The measurement portion 75, the estimation portion 76, the generation portion 77, the correction portion 78, the offset correction portion 782, the adjustment portion 79, the primary alignment portion 791, the comparator 792, the secondary alignment portion 793, and the analyzer 794 may be devices implemented in the control portion of the wireless charging control apparatus 70 or components which perform functions corresponding the respective devices. That is, the measurement portion 75, the estimation portion 76, the generation portion 77, the correction portion 78, the offset correction portion 782, the adjustment portion 79, the primary alignment portion 791, the comparator 792, the secondary alignment portion 793, and the analyzer 794 may be implemented to allow the control portion 71 of the wireless charging control apparatus 70 to execute one or more modules stored in the storage portion 72 and to be mounted on a particular operation space of the control portion 71 to perform corresponding functions. The modules may include a measurement module, an estimation module, a calculation module, a generation module, a correction module, an offset correction module, an adjustment module, a primary alignment module, an analysis module, a secondary alignment module, a comparison module, or a combination thereof.

In the wireless charging control apparatuses according to the embodiments described above, the components thereof may be function units loaded in a computing apparatus including a control unit of the wireless charging control apparatus but are not limited thereto. The components described above may be embodied to be stored as a program or software for performing the secondary charging pad alignment method or charger operation method at the wireless charging control apparatus or the charger in a computer readable recording medium or a carrier to be transmitted from a remote place to be performed.

The computer readable recording medium may be embodied as one of a program instruction, a data file, a data structure, etc. and a combination thereof. A program written in the computer readable recording medium may be particularly designed for the present invention or may be available one publicly known to one of ordinary skill in the art.

Also, the computer readable recording medium may be included in a hardware apparatus particularly configured to store and execute program instructions such as an ROM, an RAM, a flash memory, etc. The program instructions may include not only machine language codes compiled by a compiler but also high-level language codes executable by a computer using an interpreter. The hardware apparatus may be configured to be operated as one or more software modules to perform the secondary charging pad alignment method or charger operation method according to the embodiments described above and the reverse thereof may be same.

According to the secondary charging pad alignment method, the wireless charging control apparatus, and the method of operating a charger described above, a secondary charging pad disposed in a vehicle may be effectively aligned with a primary charging pad connected to the charger in the wireless charging control apparatus of the vehicle.

Also, a secondary coil of the secondary charging pad may be accurately aligned with a primary coil of the primary charging pad using hall sensors strong for a magnetic field and electric field generated between coils while wirelessly charging, thereby increasing efficiency in the wireless charging.

While the example embodiments of the present invention and their advantages have been described in detail, it should be understood that various changes, substitutions and alterations may be made herein without departing from the scope of the invention.

What is claimed is:

1. A secondary charging pad alignment method comprising:
   processing computer executable program code embodied in non-transitory computer readable storage media, by a processor, the computer executable program code comprising:
   program code that monitors signals induced at a plurality of hall sensors arranged in a vehicle;
   program code that estimates position of a primary charging pad of a charger based on measured values of the plurality of hall sensors;
   program code that corrects the estimated position of the primary charging pad according to a level of one of a voltage and a current induced at the secondary charging pad due to a sensing current of a primary coil of the primary charging pad; and
   program code that generates one of movement information for moving a secondary charging pad disposed in the vehicle to the estimated position of the primary charging pad and steering information of the vehicle corresponding to the movement information.

2. The method of claim 1, wherein the computer executable program code further comprises program code that receives primary coil information from the charger before the monitoring of the signals,
   wherein the primary coil information comprises a type of the primary coil of the primary charging pad, a level of a sensing current which flows through the primary coil, and a level of power transmitted from the primary coil.

3. The method of claim 2, wherein the computer executable program code further comprises program code that corrects the estimated position of the primary charging pad using an offset value preset according to the type of the primary coil before the generating of the steering information.

4. The method of claim 1, wherein the computer executable program code further comprises after the generating of the steering information, program code that estimates the position of the primary charging pad again based on the measured values of the plurality of hall sensors, which change according to the movement of the secondary charging pad; and analyzes a power coupling profile between the primary charging pad and the secondary charging pad.

5. The method of claim 4, wherein the computer executable program code further comprises program code that generates one of alignment information for aligning the secondary charging pad with a point at which a power coupling coefficient between the primary charging pad and the secondary charging pad is maximum according to a result of analyzing the power coupling profile and accurate steering information of the vehicle corresponding to the alignment information.

6. The method of claim 5, wherein the computer executable program code further comprises program code that calculates a steering angle of the vehicle based on one of the steering information and the accurate steering information.

7. A wireless charging control apparatus comprising:
a measurement portion which monitors signals induced at a plurality of hall sensors arranged in a vehicle;
an estimation portion which estimates a position of a primary charging pad of a charger based on measured values of the plurality of hall sensors;
a correction portion which corrects the estimated position of the primary charging pad according to a level of one of a voltage and a current induced at the second charging pad due to a sensing current of a primary coil of the primary charging pad; and
a generation portion which generates one of movement information for moving a secondary charging pad disposed in the vehicle to the estimated position of the primary charging pad and steering information of the vehicle corresponding to the movement information.

8. The apparatus of claim 7, further comprising a correction portion which corrects the estimated position of the primary charging pad using an offset correction value preset according to a type of a primary coil of the primary charging pad in primary coil information received from the charger.

9. The apparatus of claim 7, further comprising an analysis portion which analyzes a power coupling profile between the primary charging pad and the secondary charging pad,
wherein after the steering information is generated by the generation portion, the correction portion estimates the position of the primary charging pad again based on the measured values of the plurality of hall sensors, which change according to the movement of the secondary charging pad.

10. The apparatus of claim 9, further comprising an adjustment portion which generates one of alignment information for aligning the secondary charging pad with a point at which a power coupling coefficient between the primary charging pad and the secondary charging pad is maximum according to a result of analyzing the power coupling profile and accurate steering information of the vehicle corresponding to the alignment information.

11. The apparatus of claim 10, wherein the adjustment portion outputs steering angle information of the vehicle, corresponding to one of the steering information and the accurate steering information.

12. The apparatus of claim 7, wherein the plurality of hall sensors comprise two or more of a first hall sensor, a second hall sensor spaced a first distance from the first hall sensor, a third hall sensor spaced a certain distance or farther from the first and second hall sensors, and a fourth hall sensor spaced the certain distance or farther from the first to third hall sensors, and
wherein one of the first distance and the certain distances is greater than a longitudinal length of the secondary charging pad.

13. A method of operating a charger, comprising:
opening a communication channel with a wireless charging control apparatus of a vehicle;
applying a sensing current to a primary coil of a primary charging pad adjacent to the vehicle; and
comparing a current power coupling coefficient between the primary charging pad and a secondary charging pad of the vehicle with a reference power coupling coefficient.

14. The method of claim 13, further comprising, before the applying of the sensing current, transmitting primary coil information to the wireless charging control apparatus of the vehicle.

15. The method of claim 14, wherein the primary coil information comprises one of a type of the primary coil, a level of the sensing current, a level of power transmitted from the primary coil, and a combination thereof.

16. The method of claim 13, further comprising controlling an operation of the primary charging pad to apply the sensing current to the primary charging pad when the power coupling coefficient is the reference power coupling efficient or less.

17. The method of claim 13, wherein the opening of the communication channel is performed based on a beacon signal of one of the vehicle and the charger.

18. A secondary charging pad alignment method comprising:
processing computer executable program code embodied in non-transitory computer readable storage media, by a processor, the computer executable program code comprising:
program code that receives primary coil information from the charger,
program code that monitors signals induced at a plurality of hall sensors arranged in a vehicle;
program code that estimates a position of a primary charging pad of a charger based on measured values of the plurality of hall sensors; and
program code that generates one of movement information for moving a secondary charging pad disposed in the vehicle to the estimated position of the primary charging pad and steering information of the vehicle corresponding to the movement information,
wherein the primary coil information comprises a type of the primary coil of the primary charging pad, a level of a sensing current which flows through the primary coil, and a level of power transmitted from the primary coil.

* * * * *